Figure 1:
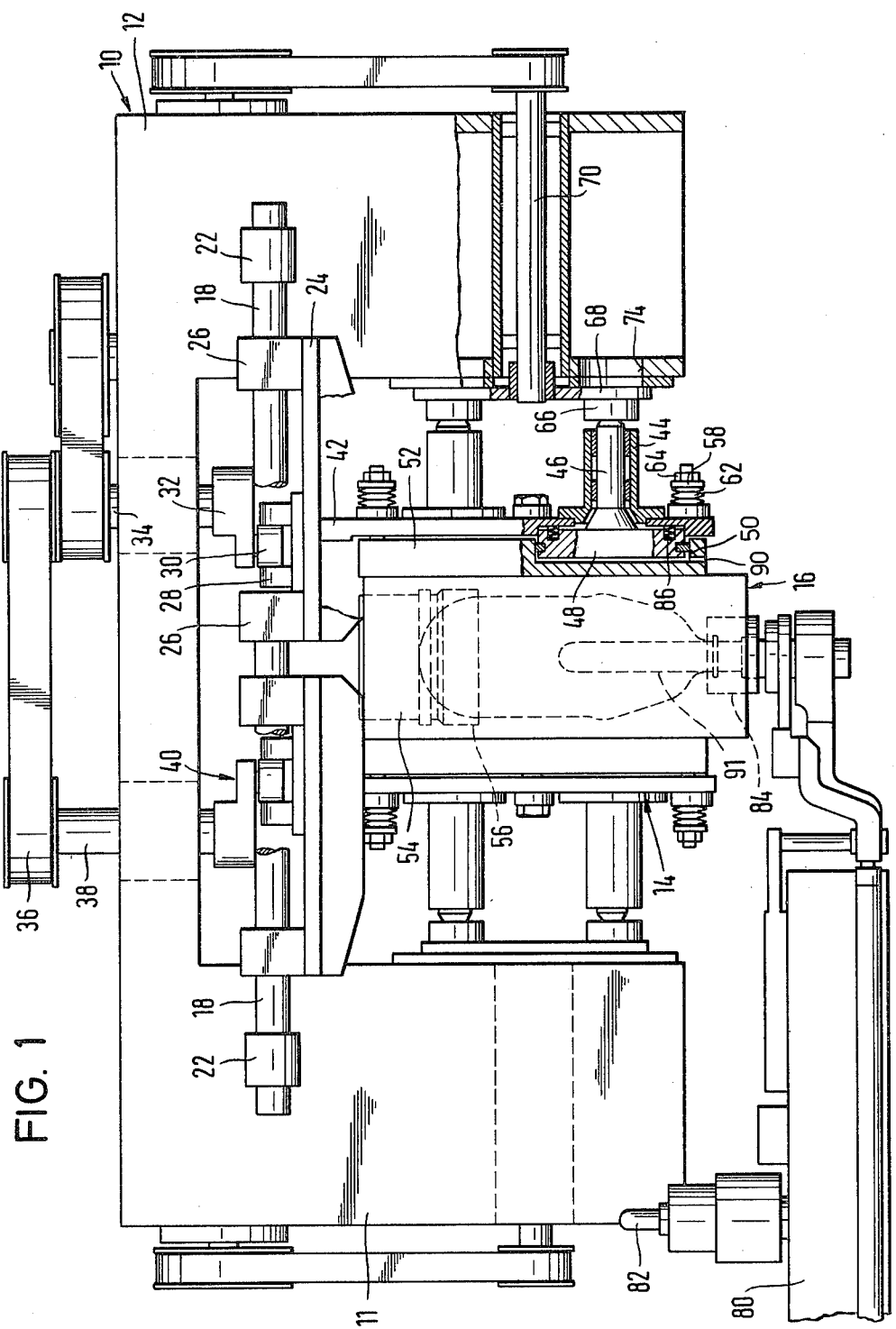

United States Patent [19]

Albrecht et al.

[11] 4,427,360
[45] Jan. 24, 1984

[54] APPARATUS FOR BLOW MOLDING PLASTIC ARTICLES FROM A PARISON

[75] Inventors: Peter Albrecht; Wolfgang Reymann; Klaus Vogel, all of Hamburg, Fed. Rep. of Germany

[73] Assignee: Krupp Corpoplast Maschinenbau GmbH, Hamburg, Fed. Rep. of Germany

[21] Appl. No.: 335,885

[22] Filed: Dec. 30, 1981

[51] Int. Cl.³ .............................................. B29C 17/07
[52] U.S. Cl. .................................. 425/541; 425/450.1; 425/451.9
[58] Field of Search .................... 425/541, 450.1, 451.9

[56] References Cited

U.S. PATENT DOCUMENTS 2,559,235  2/1971  Hagen ............................. 425/541 X
4,273,524  6/1981  Smith ............................. 425/451.9 X

FOREIGN PATENT DOCUMENTS 1006590  4/1957  Fed. Rep. of Germany ... 425/450.1
2545130  6/1980  Fed. Rep. of Germany .
1309009  3/1973  United Kingdom ............. 425/451.9

Primary Examiner—Jan H. Silbaugh
Attorney, Agent, or Firm—Andrus, Sceales, Starke & Sawall

[57] ABSTRACT

In the art of blow molding thermoplastic articles a pair of blow mold halves is closed around a parison. A blowing medium is applied so that the parison is thus blown to a container configuration. In this blowing step very high closing forces are necessary to maintain the mold halves in closed position. The invention provides for a plurality of biased pistons which are actuated by a pressure medium to support the mold halves on a stationary frame.

12 Claims, 3 Drawing Figures

APPARATUS FOR BLOW MOLDING PLASTIC ARTICLES FROM A PARISON

The present invention relates to an apparatus for blow molding thermoplastic containers from parisons, comprising a stationary member, a pair of blow mold sections, guide means and a drive means to move said mold sections along said guide means between a closed position and an opened position. In the closed position the parison is blown to a configuration determined by the inner walls of said mold sections, whereas in the open position the final container is removed and a new parison is transported into the blow mold.

In the closed position of the mold sections substantial forces are required to hold the mold sections in the closed position against the blow pressure acting within the blow mold. The closing forces increase as the pressure of the blow medium increases and as the container size becomes larger. Even a small spreading apart of the parting line between the mold sections caused by a high pressure of the blow medium results in a pronounced mark of the container along the parting line.

In the prior art, arcuate-shaped levers are usually provided to connect the mold sections to each other. To open and to close the mold halves said levers are eccentrically supported on a drive shaft which takes up the closing forces referred to above. In order to obtain a high closing pressure, the prior art further aligns the pivot points of said levers in the closed position of the mold halves diametrically opposed with respect to each other in a dead center position (German Patent 25 45 130). There are still other prior eccentric drive means providing pivotally supported linkage members to produce the closing forces which are transferred to stationary frame members through suitable bearings. All this results in large dimensions and heavy weight structures of the linkage members which further need high driving forces for actuation and react accordingly slowly. This is particularly true for knee lever linkages.

An object of the invention is to provide an apparatus capable of supporting the blow mold halves on a stationary frame member. A further object is to provide an apparatus capable of obtaining high closing forces without the necessity of actuating heavy weight members.

According to a preferred embodiment of the present invention at least a bias piston is provided to which a pressure medium is applied to support the blow mold halves on a stationary frame member.

According to the invention there are relatively simple drive means provided to displace the mold halves from the closed into the opened position and vice versa which drive and guide means do not take up any closing and supporting forces. In the closed position of the mold halves the closing forces are rather produced by applying pressure medium to the bias pistons to sustain the mold halves against the stationary members. In this manner very high closing forces can be obtained and, accordingly the blow mold station may comprise two or even more blow mold configurations. In other words two or more parisons may be blown into their final shape at the same time. Further the air pressure pistons deliver an elastic bias force thus compensating for the resilient deformation of the frame which accordingly needs a less rigid structure than hitherto.

According to a further feature of the invention the stationary member is a U-shaped frame. This facilitates a free passage of the parisons and the final containers through the blow mold halves when in their opened position.

According to a still further embodiment the structure needs little space when the bias pistons perform a short stroke and are slidingly received in a cylinder plate which is mounted to one blow mold half. A number of bias pistons in a symmetrical arrangement may be provided for each blow mold half.

In a still further embodiment of the invention the pressurized blowing medium is applied to said bias pistons. As the bias pistons perform a relatively short stroke to produce the closing forces, the pressure of the bias pistons increases faster than the pressure in the blow mold when the blowing medium is applied to the parison and to the pistons at the same time. Accordingly the blow mold sections are reliably closed under a bias force before the blowing pressure increases to high values. Further venting the pistons upon terminating the blowing step takes place very rapidly.

According to a still further feature of the invention the cross section of the piston to which the blowing medium is applied is larger than the projected area of the container figuration. This is particularly useful when the blowing medium is utilized to actuate the pistons.

Other objects and features of the invention will appear from the following description and claims.

Figure 2:
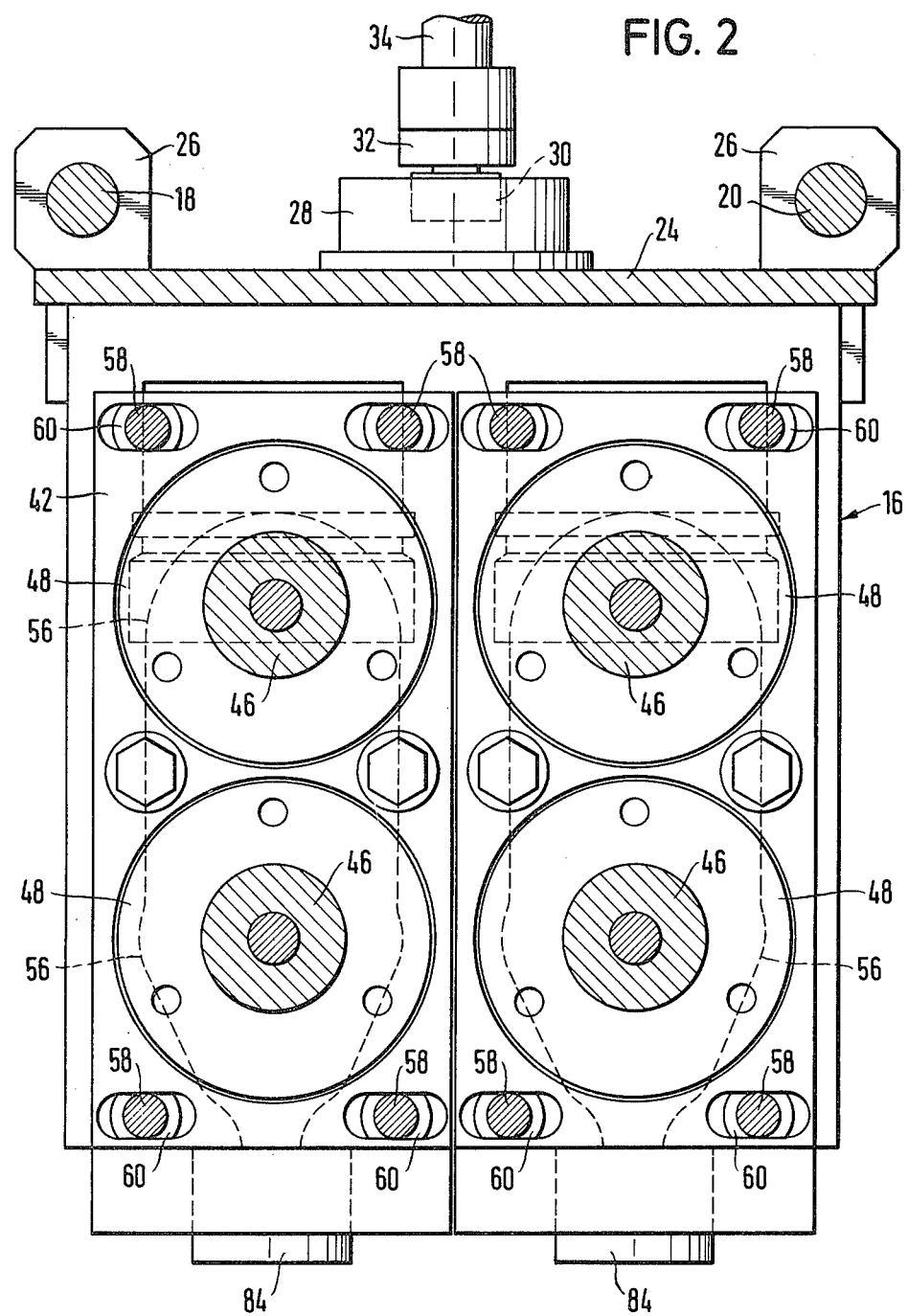
Figure 3:
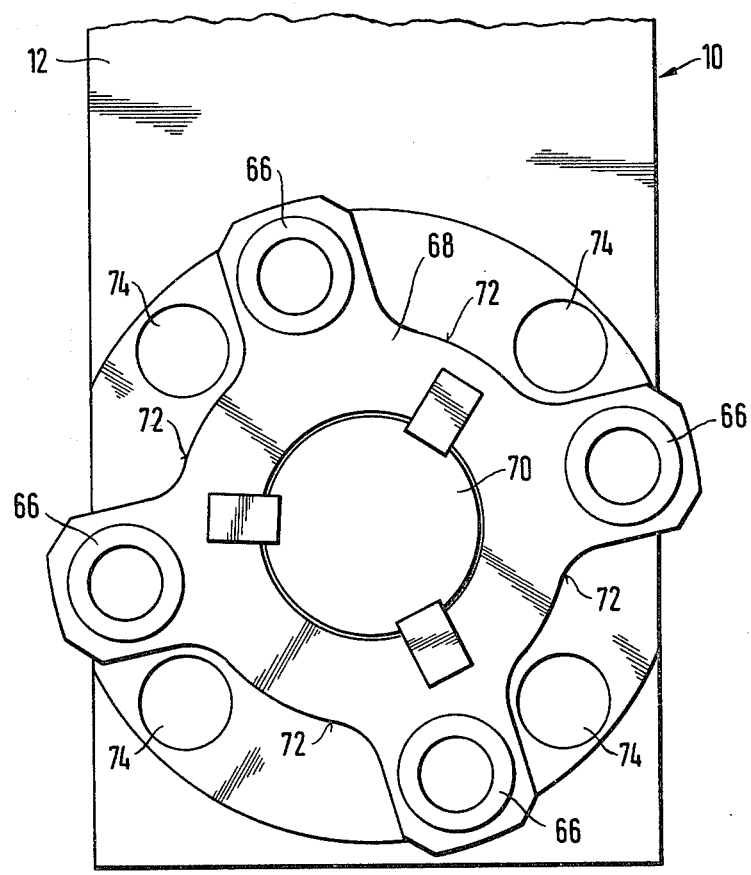

FIG. 1 is an elevational view of a blow mold station, parts thereof being shown in section, FIG. 2 a front view of the bias pistons and cylinder plate of a tandem blow mold section with the blow mold carrying member removed, and FIG. 3 a front view of a locking disc.

The blow mold station shown in FIG. 1 comprises a stationary U-shaped frame 10 having legs 11 and 12 between which a pair of sectional mold halves 14, 16 is provided which mold halves are movable along rods 18, 20 (FIG. 2) which are supported at both sides of the frame. In FIG. 1 the forward rod 18 only is shown which is rigidly connected to the frame 10 by suitable means 22.

Instead of the U-shaped frame as shown in the drawings which frame allows the parisons as well as the finally blown containers to freely pass between the mold halves 14, 16 in their open position, other stationary members to take up the blow pressure may be used.

As the mold halves 14, 16 are of identical structure, the right-hand mold half being shown in section in FIG. 1 is explained in some detail as follows: As far as the left-hand mold half is concerned identical reference numerals prevail.

An upper support plate 24 is provided with a pair of lugs 26 having bores through which the guide rods 18, 20 extend. Further the support plate 24 carries a bearing 28 in which the roller 30 of a crank 32 is received. In rotating the shaft 34 to which the crank 32 is connected, the mold halves 16 are moved from the open position into the closed position and vice versa. The rotation of the shaft 34 further rotates via a toothed belt 36 a further shaft 38 which reciprocates the other mold half 14 in a corresponding manner through an identical crank drive 40.

A plate-like mold carrying member 42 extends vertically downward from the support plate 24 and is secured thereto. A number of bearing sleeves 44 are mounted on the backside of the mold carrying member 42, each bearing sleeve guiding a piston rod 46 which is connected to a bias piston 48. Each bias piston 48 slidingly fits into a cylinder bore 50 of a cylinder plate 52. The mold half 54 is rigidly connected to the cylinder plate 52. The contour 56 of the container to be blown is shown in dotted lines.

A number of bolts 58 are provided to connect the cylinder plate 52 to the mold carrying member 42 which bolts are screwed into threaded bores of the cylinder plate 52 and freely extend through openings 60 of the mold carrying member. A plurality of Belleville type springs 62 are provided between the mold carrying member 42 and a nut 64 threaded on the bolt 58 to urge the cylinder plate 52 and the mold half 54 against the mold carrying member 42 by means of said springs. Accordingly the mold half is returned to its initial position after the pressure applied by the bias pistons has been released.

In the closed position of the mold halves the piston plungers 46 abut upon projections 66 which are provided at a locking disc 68 which is secured to a shaft 70 which is rotatably supported in the leg 12 of the frame 10. The locking disc 68 includes a number of projections 66 and a number of recesses 72 therebetween (FIG. 3). To displace the blow mold half 16 into the open position the locking disc 68 is rotated at an angle such that the piston plungers 46 can enter openings 74 in the frame through the recesses 72 at the periphery of the locking disc. The shaft 70 is drivingly connected to the shaft 34 which drives the blow mold halves; accordingly the motions of the locking disc and of the blow mold halves are synchronized with respect to each other.

Assuming that the blow mold halves 14, 16 are in the open position, which is not shown, a rotating table 80 which is schematically shown is rotated about its axis 82 at an incremental step so that a pair of finished containers may be removed from between the blow mold halves and a pair of parisons 91 may enter the mold station which parisons are held on transfer mandrels 84 at a predetermined peripheral distance from the rotating table. Thereupon the crank drive means are operated to close the mold halves and then the locking disc 68 is rotated such that the projections 66 are aligned with the plungers 46. There are springs 86 inserted between the mold carrying plate 42 and the bias pistons 48 to somewhat lift the plungers slightly to enable the locking disc 68 to be freely rotated between the frame and the plungers 46.

As soon as the mold halves are in the closed position pressurized air is applied to the parison 91 by a blow mandrel as usual and further through a port 90 into the space between the bias piston 48 and the cylinder plate 52. Accordingly the mold halves 14, 16 are firmly pressed against each other into closing contact and further the mold halves are elastically supported on the bias pistons by means of the pressure pad. From this results that all closing forces act upon the leg 12 of the frame through the plunger 46 and projections 66 of the locking disc 68. The drawings show that the stroke of the piston is very short to exert the bias force. Thus the pressure on the bias pistons is faster built up than the blow pressure increase in the blow mold.

FIG. 2 shows that the area of the bias pistons to which air pressure is applied is larger than the area of the container to be blown which area is shown in dotted lines as projected onto the plane of the drawing. This of course is thought in case that the pressure applied to the pistons and the blow pressure is equal.

As mentioned above the mold halves 14 and 16 are of identical structure. In a further embodiment it should be sufficient that one mold half only is provided with air pressure actuated bias pistons.

We claim:

1. Apparatus for blow molding plastic containers from blowable parisons comprising:
    a stationary frame;
    a pair of mold halves (14, 16) forming a mold cavity, at least one of said mold halves being movable for placing the mold halves in a closed position and an open position, a parison being insertable in the mold cavity and subjected to a blowing medium when the mold halves are in the closed position, and a finished container being removable and a new parison being insertable when the mold halves are in the open position;
    a cylinder plate (52) on which said movable mold half (16) is mounted;
    a mold carrying member (42) coupled to said cylinder plate so as to permit movement of said cylinder plate with respect to said mold carrying member, said mold carrying member being movably mounted on said frame for moving the mold half between the open and closed positions;
    at least one piston (46-48) carried by said mold carrying member, said piston being in abutment with said frame and extending into a cylinder in said cylinder plate opposite said movable mold half; and
    means for applying a pressurizing medium to said cylinder between said cylinder plate and piston to apply a force to the mold halves resisting separation of the mold halves.

2. The apparatus of claim 1 further including guide rods on said frame, said mold carrying member being movably mounted on said guide rods.

3. The apparatus of claim 1 wherein both said mold halves are movable toward and away from each other along an axis of movement, and wherein the stationary frame is further defined as U-shaped and having portions lying normal to the axis of movement of the mold halves, at least one bias piston being interposable between each of said mold halves and said portions of said frame member.

4. The apparatus of claim 1 wherein said bias piston is slidably received in said cylinder in said cylinder plate, and wherein said piston and cylinder are so dimensioned that said piston performs a relatively short stroke in said cylinder when the pressurizing medium is applied.

5. The apparatus of claim 1 further defined as including a plurality of pistons interposed between said frame and cylinder plate, said pistons being arranged symmetrically with respect to said movable mold half.

6. The apparatus of claim 1 wherein said piston is further defined as connected to the source of blowing medium for the parison for receiving the blowing medium as the pressurizing medium.

7. The apparatus of claim 6 wherein the area of the mold cavity is projectable onto a plane parallel to the cylinder plate and wherein the area of the piston to which the blowing medium is applied is larger than the projected area of the mold cavity.

8. The apparatus of claim 5 wherein said pistons are further defined as connected to the source of blowing medium for the parison for receiving the blowing medium as the pressurizing medium, wherein the area of the mold cavity is projectable onto a plane parallel to the cylinder plate, and wherein the area of the pistons to which the blowing medium is applied is larger than the projected area of the mold cavity.

9. The apparatus of claim 1 further including locking means operatively associated with said piston and frame, said locking means having a first condition in which forces on said mold halves when in the closed position are transferred to said frame, and a second condition for permitting movement of said mold halves with respect to the frame for moving the mold halves to the open position.

10. The apparatus of claim 9 wherein said piston has a rod abuttable with said locking means, and wherein said locking means comprises a locking disc rotatably supported in said frame, said rod abutting against said locking disc when it is in one rotational position and wherein said rod extends past said locking disc when it is in another rotational position to permit movement of the mold halves to the open position.

11. The apparatus of claim 1 including means interposed between said cylinder plate and mold carrying member for resiliently urging the cylinder plate toward the mold carrying member.

12. The apparatus of claim 1 further including bias means interposed between said piston and said mold carrying member.

* * * * *